(12) United States Patent
Graville

(10) Patent No.: US 8,663,589 B2
(45) Date of Patent: Mar. 4, 2014

(54) $CO_2$ RECOVERY USING THE SURE PROCESS

(71) Applicant: Linde Aktiengesellschaft, Munich (DE)

(72) Inventor: Stephen Rhys Graville, Berg (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 13/623,446

(22) Filed: Sep. 20, 2012

(65) Prior Publication Data

US 2013/0071308 A1 Mar. 21, 2013

(30) Foreign Application Priority Data

Sep. 21, 2011 (EP) .................... 11007676

(51) Int. Cl.
| | |
|---|---|
| *B01D 53/52* | (2006.01) |
| *B01D 53/62* | (2006.01) |
| *B01D 53/74* | (2006.01) |
| *B01D 53/75* | (2006.01) |
| *B01D 53/76* | (2006.01) |
| *C10L 3/10* | (2006.01) |
| *E21B 43/16* | (2006.01) |
| *E21B 43/22* | (2006.01) |

(52) U.S. Cl.
USPC ............. 423/220; 423/574.1; 423/576.2; 422/168; 422/172; 422/187; 48/127.3; 48/127.5; 48/127.7; 48/127.9; 507/935; 166/402

(58) Field of Classification Search
USPC ........... 423/220, 574.1, 576.2; 422/168, 172; 422/187; 48/127.3, 127.5, 127.7, 127.9; 507/935; 166/402
See application file for complete search history.

(56) References Cited

U.S. PATENT DOCUMENTS

| | | | | |
|---|---|---|---|---|
| 4,289,738 A | * | 9/1981 | Pearce et al. | 423/228 |
| 4,344,486 A | * | 8/1982 | Parrish | 166/272.1 |
| 4,546,829 A | * | 10/1985 | Martin et al. | 166/267 |
| 5,061,465 A | * | 10/1991 | Carter | 423/229 |
| 5,294,428 A | | 3/1994 | Watson | |
| 6,352,680 B1 | | 3/2002 | Watson et al. | |
| 6,638,057 B2 | | 10/2003 | Watson et al. | |
| 6,919,059 B2 | | 7/2005 | Watson et al. | |
| 7,354,564 B2 | | 4/2008 | Graville et al. | |
| 7,544,344 B2 | | 6/2009 | Graville | |
| 2003/0108839 A1 | | 6/2003 | Watson et al. | |
| 2003/0133850 A1 | | 7/2003 | Watson et al. | |
| 2004/0096381 A1 | | 5/2004 | Watson et al. | |
| 2005/0180913 A1 | | 8/2005 | Graville et al. | |
| 2006/0067875 A1 | * | 3/2006 | Koss et al. | 423/573.1 |

(Continued)

FOREIGN PATENT DOCUMENTS

| | | |
|---|---|---|
| EP | 0 974 552 A2 | 1/2000 |
| WO | 01/48423 A1 | 7/2001 |

(Continued)

*Primary Examiner* — Timothy Vanoy
(74) *Attorney, Agent, or Firm* — Millen, White, Zelano & Branigan, P.C.

(57) ABSTRACT

The invention relates to a method for recovering sulphur from a sour gas containing hydrogen sulphide and carbon dioxide, comprising: oxidation of the sour gas, wherein a part of the hydrogen sulphide is oxidized to sulphur dioxide and water, reaction of the resulting sulphur dioxide with the residual hydrogen sulphide to elementary sulphur, and removal of elementary sulphur. According to the invention carbon dioxide and/or carbon dioxide generated by oxidation of the sour gas is compressed, and at least a part of the carbon dioxide is injected into an oil well. Furthermore, the invention relates to a plant suitable for performing the above method.

20 Claims, 1 Drawing Sheet

(56) References Cited

U.S. PATENT DOCUMENTS

2007/0134147 A1 6/2007 Graville
2012/0027656 A1* 2/2012 Schaffer et al. .............. 423/222
2012/0279728 A1* 11/2012 Northrop et al. .............. 166/401

FOREIGN PATENT DOCUMENTS

| WO | 02/20139 A1 | 3/2002 |
| WO | 03/070633 A1 | 8/2003 |
| WO | 2005/007570 A2 | 1/2005 |

* cited by examiner

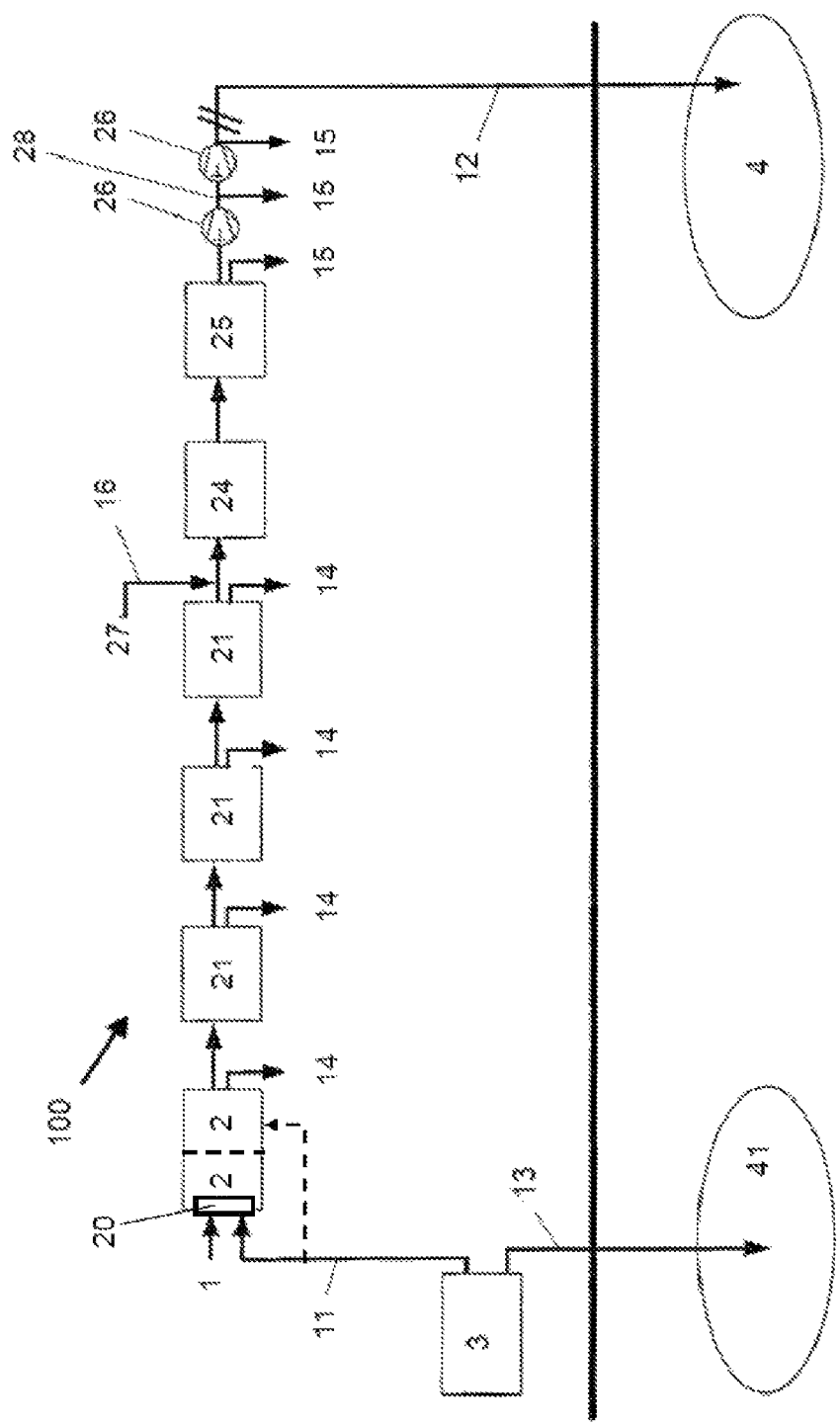

CO₂ RECOVERY USING THE SURE PROCESS

This application claims 35 USC 119 benefit of the filing date of European patent application serial number 11007676.7, filed on Sep. 21, 2011.

SUMMARY OF THE INVENTION

The present invention relates to a method for recovering sulphur and carbon dioxide from a sour gas containing hydrogen sulphide and carbon dioxide comprising: oxidation of the sour gas, wherein a part of the hydrogen sulphide is oxidized to sulphur dioxide and water; reaction of the resulting sulphur dioxide with the residual hydrogen sulphide to elementary sulphur, and removal of elementary sulphur.

Further, the present invention relates to a plant for recovering sulphur and carbon dioxide from a sour gas containing hydrogen sulphide and carbon dioxide comprising: at least one furnace for oxidation of hydrogen sulphide to sulphur dioxide and water; a catalytic converter connected to the furnace for formation of elementary sulphur from sulphur dioxide and hydrogen sulphide; means for extracting elementary sulphur; a hydrogenation reactor connected to the catalytic converter for hydrogenation of the sour gas; means for providing hydrogen used for the hydrogenation connected to the hydrogenation reactor; and a first water removal unit for the removal of water connected to the hydrogenation reactor.

Thus, such a method for recovering sulphur and carbon dioxide from a sour gas containing hydrogen sulphide and carbon dioxide comprises at least: oxidation of the sour gas, wherein a part of the hydrogen sulphide is oxidized to sulphur dioxide and water, reaction of the resulting sulphur dioxide with the residual hydrogen sulphide to elementary sulphur, and removal of elementary sulphur. This is disclosed for instance in U.S. Pat. No. 5,294,428.

In processing of raw oil and natural gas a sour or acid gas containing hydrogen sulphide is an undesired by-product. One possibility of sour gas treatment is the recovery of sulphur which is usually facilitated in industrial scale via a Claus process, wherein a part of hydrogen sulphide is oxidized to sulphur dioxide and the formed sulphur dioxide reacts with the residual hydrogen sulphide to elementary sulphur.

An improved Claus technology is based on using high purity oxygen in a sulphur recovery unit. The acid gas cannot normally be burnt directly with the highly pure oxygen as the combustion temperature is too high. For high strength acid gas high temperatures result in the reaction furnace, which can be safely moderated through the use of the SURE (Sulphur Recovery) Double Combustion, which is for instance described in U.S. Pat. No. 5,294,428, EP 1 315 548 (WO 02/20139), and EP 1 644 286 (WO 2005/07570). For low strength acid gas fired with high purity oxygen a single reaction furnace is adequate. For both options a BOC SURE™ burner may be used, which is for instance described in EP 974 552, EP 1 240 460 (WO 01/48423), and EP 1 483 199 (WO 03/70633), for the injection of the acid gas and oxygen into the reaction furnace.

Currently in many parts of the world there are significant quantities of sour natural gases being extracted from gas fields. Hydrogen sulphide present in the natural gas is removed in gas processing units through typically an amine unit. The acid gas product from the gas processing plant typically contains 20-80% vol $H_2S$ and some $CO_2$, COS and $CS_2$. Hydrocarbons such as methane or BTX (benzene, toluene, xylene) may also be present. Much research has been carried out regarding the transportation and re-injection of this acid gas. However, safety concern about the transportation and also the interaction of the $H_2S$ with oil/gas once re-injected into the field has so far prevented this technology from becoming truly commercial. Therefore acid gas is traditionally processed in a sulphur recovery unit (SRU) with air. A minimum acid gas concentration of 40% vol $H_2S$ is typically required in the sulphur recovery unit (SRU) with air, therefore requiring the need for acid gas enrichment (with an amine) in many instances. If BTX is present in the acid gas and not thermally destroyed downstream operational issues with solid build-up and blockages may occur. This is normally due to insufficient temperature in the reaction furnace (>1100° C.) and poor mixing or the use of staged acid gas injection where contaminants maybe allowed to bypass the hot oxidative conditions in the flame region. Natural gas firing (directly or indirectly) is normally used to ensure destruction, however, at significant cost of the lost fuel sales and much larger plant requirements (and capital). Using high purity oxygen allows processing of much weaker acid gas (>20% vol $H_2S$) and/or acid gas with BTX. The corresponding cost of an SRU with oxygen firing is considerably lower than that of the equivalent air based plant due to the process intensification and requirement for smaller plants.

Based on this background, the problem underlying the present invention is to provide for a method and plant of the afore-mentioned kind that allows for treating unwanted by-products cost efficiently and in an environment-friendly manner.

This problem is solved by a method wherein carbon dioxide and/or carbon dioxide generated by the oxidation of the sour gas is compressed, and at least a part of the carbon dioxide and/or said carbon dioxide generated by the oxidation of the sour gas is injected into an oil well.

Thus, in accordance with the invention, there is provided a method of the above-mentioned type in which carbon dioxide and/or carbon dioxide generated by oxidation of the sour gas with high purity oxygen is compressed, and at least a part of this carbon dioxide, particularly all of the present carbon dioxide, is injected into an oil well (field).

Upon further study of the specification and appended claims, other aspects and advantages of the invention will become apparent.

Additional preferred embodiments and aspects are further described herein.

Particularly, the invention is based on the fact that sour gas primarily containing hydrogen sulphide and carbon dioxide will, after treatment with high purity oxygen in a Claus sulphur recovery unit, produce a stream of high concentration carbon dioxide, after elemental liquid sulphur has been separated. This carbon dioxide can be recovered, further treated if necessary, compressed and injected into an oil well for enhanced oil recovery.

Carbon dioxide in the sense of the invention particularly means carbon dioxide which is present in a sour gas containing hydrogen sulphide before the sulphur recovery process, and which is additionally formed during the sulphur recovery process by reactions such as oxidation or hydrolysis of hydrocarbons, COS and $CS_2$. All of this carbon dioxide or a part of this carbon dioxide may be compressed and may be injected into an oil well.

For optimal conversion of hydrogen sulphide to elementary sulphur preferably only a part of hydrogen sulphide is oxidized. Typically, one third of the hydrogen sulphide is converted to sulphur dioxide that then reacts with the remaining two thirds of the hydrogen sulphide to form elementary sulphur. The formation of elementary sulphur via the Claus reaction will take place in parallel to the oxidation reaction. Additionally, the oxidation may be performed in the presence of oxygen enriched air or high purity oxygen. Oxygen enriched air means air with an oxygen content typically up to 45% vol. High purity oxygen in the sense of the invention means oxygen with a purity of at least 95% vol. By using high purity oxygen instead of air or oxygen enriched air, the nitrogen is almost completed removed from the process. The use of high purity oxygen allows for a greater quantity of sour gas to be treated in the same unit and therefore high purity oxygen can be used to debottleneck the unit or for a new plant a much smaller unit can be utilized. Since nitrogen is almost eliminated a high strength carbon dioxide stream (>95% vol) can be produced from the tail gas of the plant.

For higher strength acid gas streams (>60% vol $H_2S$) that could cause high furnace temperatures it would be preferential to oxidize the $H_2S$ according to a combustion method that is also called the SURE Double combustion method (in this respect, concerning details of the combustion, it is additionally referred to U.S. Pat. No. 5,294,428), wherein particularly less than one third of the hydrogen sulphide of the sour gas is oxidized by highly purity oxygen in a first combustion region to form water vapor, and sulphur dioxide so that, elemental sulphur vapor can be produced from the reaction of the sulphur dioxide with unburnt hydrogen sulphide In a second reaction furnace the remaining oxygen required to control the stoichiometry of the Claus reaction is added via a lance system. By adding the oxygen via two reactions furnaces with inter-stage cooling by a steam generating waste heat boiler the temperatures in each unit can be safely controlled. The sour gas in the second reaction furnace mixed with the remaining oxygen is preferably >600C and above the auto-ignition temperature of the sour gas. After the hydrogen sulphide reacts with the sulphur dioxide in at least one catalytic region the elementary sulphur vapor is extracted. The molar ratio of hydrogen sulphide to sulphur dioxide is particularly adjusted upstream of the catalytic region by control of the oxygen addition in the second combustion region to bring the molar ratio to the stoichiometric value or to an approximation of the stoichiometric value. The stoichiometric value is 2 moles hydrogen sulphide and 1 mole sulphur dioxide that reacts to 3 moles sulphur and 2 moles water.

After oxidation, the sour gas may be cooled to temperatures below 140° C. and already formed sulphur may be removed. Then, the sour gas may be heated again and transferred to a different compartment such as a catalytic converter. In such a catalytic converter the remaining sulphur dioxide and hydrogen sulphide preferably react to sulphur in presence of a catalyst such as for instance aluminum (III) oxide or titanium (IV) oxide. The formed elementary sulphur is then preferably removed. Additional catalytic converter stages may follow. For optimizing the formation of elementary sulphur the sour gas may particularly be reheated before entering the catalytic converter.

During or after the oxidation the formed elementary sulphur is preferably in the gaseous phase due to the elevated temperatures. After the oxidation the sulphur may condense to liquid or solid phase by lowering the temperature and can be simply removed by gravity from the sour gas, for instance. The condensing reaction may be performed in a separate vessel. Furthermore, the condensing reaction and the following removal of liquid or solid sulphur may be repeated one or several times.

For lower strength sour gas streams where the H2S concentration <60% the oxidation of the hydrogen sulphide with high purity oxygen can be carried out in a single reaction furnace without the requirement of the SURE Double Combustion process. However, should all the high purity oxygen be added to a single reaction furnace then it would be preferable to utilize a proprietary burner such as the SURE burner (as described in detail in e.g. EP 974 552, EP 1 240 460, and EP 1 483 199) to ensure intermit mixing of high purity oxygen and the sour gas. The limiting factor for the use of a single reaction furnace in order to achieve all the oxidation reactions is typically determined by the high temperature resistance of the refractory in the furnace. For a single reaction furnace the adiabatic flame temperatures would typically be controlled below 1500C, provided high temperature refractory is used in the furnace exposed to the flame.

The injection of $CO_2$ into the oil well removes hydrocarbons that cannot be removed by conventional techniques, by the formation of a miscible $CO_2$/oil mixture and a reduction of the hydrocarbons viscosity, so that the liquid can be more easily liberated from the rock or pore structure it could not originally be removed from. Thus, output of the reservoir is increased by the technique which is commonly termed Enhanced Oil Recovery. For the reservoirs deeper than 600 m, the use of carbon dioxide in the supercritical state is particularly effective. The supercritical state of carbon dioxide is present at a temperature above 31° C. and a pressure above 73.8 bar.

A sour gas containing hydrogen sulphide and carbon dioxide may also comprise hydrocarbons such as methane or BTX (benzene, toluene, xylene) and other carbon compounds like COS and $CS_2$. During the oxidation of $H_2S$ these hydrocarbons are oxidized or hydrolyzed to carbon dioxide and water. Additionally, COS and $CS_2$ may be formed during the oxidation of hydrogen sulphide.

According to a preferred embodiment of the invention, the sour gas is oxidized at a temperature above 1000° C., more preferably at a temperature of 1400° C.

According to another preferred embodiment, the removal of sulphur comprises the condensing of sulphur vapor to the liquid or the solid phase and the separation of the liquid or solid sulphur for the gas phase, preferably by gravity.

Also preferred is an embodiment, in which the sour gas is hydrogenated after the removal of elementary sulphur. Elementary hydrogen is mixed with the sour gas, wherein residual sulphur can be reduced to hydrogen sulphide. More importantly, present $CS_2$ and COS are converted to $CO_2$ and $H_2S$. The hydrogenation reaction may be performed in a suitable reactor with an active hydrogenation catalyst such as a nickel-chromium or chromium-molybdenum promoted catalyst. The hydrogen can be injected into the hydrogenation reaction from a supply or may be provided by a reducing gas generator. In such a reducing gas generator, fuel gas is preferably burnt substoichiometrically to generate elementary hydrogen and CO. The fuel gas may be natural gas. The additionally formed hydrogen sulphide in the sour gas may be removed by amine gas treating, if necessary. Additionally, the sour gas may be heated via a burner before reacting with hydrogen. Furthermore, the hydrogenated sour gas may be cooled after the hydrogenation reaction by a heat exchanger, wherein the excess heat of the sour gas can be used for steam production.

According to yet another embodiment, the hydrogen used for the hydrogenation is provided by a reducing gas generator. Particularly, the reducing gas generator is fired by natural gas.

According to another embodiment, water formed from the oxidation of hydrogen sulphide or hydrogenation of sulphur dioxide and COS can be removed downstream of the hydrogenation reactor. Because of the high reaction temperature water is formed as a vapor during the oxidation of hydrogen sulphide. The water vapor can be removed by a direct water quench, wherein the hot sour gas is cooled with water below the boiling point of water. The water vapor condenses to liquid water and can be removed from the sour gas. This water removal may be performed in a suitable vessel, preferably in a quench column or a stripping column, where the hot sour gas is contacted with water, in particular with water sprays.

According to yet another embodiment, the carbon dioxide and/or carbon dioxide generated by the oxidation of the sour gas is compressed to at least 2 bar, or more preferably to at least 80 bar.

According to another embodiment, residual moisture is removed from the carbon dioxide and/or carbon dioxide generated by the oxidation of the sour gas after compression, preferably by a chilling unit or by a molecular sieve drier.

The oxidation of hydrogen sulphide must be performed in the presence of high purity oxygen to almost eliminate the nitrogen in the carbon dioxide stream such that a high purity >95% vol carbon dioxide stream for Enhanced Oil Recovery can be produced.

According to another embodiment, the high purity oxygen is provided by an air separation process. Such an air separation process may be a cryogenic distillation, wherein atmospheric air is compressed to a pressure typically between 5 and 10 bar and liquefied. The liquid air is then preferably distilled in one or often two distillation columns and separated into oxygen and nitrogen. Other air separation processes include, without being restricted to, pressure swing adsorption, vacuum pressure swing adsorption or air separation by a membrane.

According to yet another embodiment, nitrogen formed in the air separation process is preferably injected in oil wells or in condensate gas fields.

An injection of nitrogen into a condensate gas field may support or maintain the pressure in the condensate gas reservoir. Condensate gas in the sense of the invention thereby means a mixture of hydrocarbon liquids that are present in raw natural gas produced form natural gas fields. The hydrocarbons liquids are in the gaseous phase in the raw natural gas and condense if the temperature is reduced below the hydrocarbon dew point of the raw gas.

Furthermore, the problem of the invention is solved by a plant (also called SRU for sulphur recovery unit) having the features of a compressor stage connected to the first water removal unit for compressing the carbon dioxide and/or carbon dioxide generated by oxidation of the sour gas, and means for injecting the carbon dioxide and/or carbon dioxide generated by the oxidation of the sour gas into an oil well, which means are connected to the compressor stage (25).

Thus, in accordance with the invention, there is provided a plant for sulphur recovery from a sour gas containing hydrogen sulphide and carbon dioxide is provided. The plant is particularly provided and configured to perform or to be used within the method according to the invention.

The plant preferably comprises: a furnace for oxidation of hydrogen sulphide to sulphur oxide and water, a catalytic converter connected to the furnace for formation of elementary sulphur from sulphur dioxide and hydrogen sulphide, means for extracting the elementary sulphur, a hydrogenation reactor connected to the catalytic converter for hydrogenation of the sour gas, means for providing hydrogen used for the hydrogenation connected to the hydrogenation reactor, and a first water removal unit for removal of water is connected to the hydrogenation reactor, wherein a compression stage connected to the water removal unit and means for injection of residual carbon dioxide into an oil well are connected to the compression stage.

A furnace in the sense of the invention is a device for combustion of flammable gases such as sour gas containing hydrogen sulphide. The furnace may particularly include, without being restricted to, a refractory lined vessel, a combustion region, an oxygen and sour gas intake pipe, an exhaust vent pipe, a burner and a heat exchanger. The heat exchanger may be used to generate hot steam and may be a waste heat boiler. The furnace is particularly designed to facilitate the method according to the invention, in particular to facilitate the oxidation of hydrogen sulphide to sulphur at temperatures above 1000° C. Additionally, the furnace may also facilitate the reaction of hydrogen sulphide and sulphur dioxide to elementary sulphur.

Alternatively, the furnace may be designed to facilitate the oxidation of hydrogen sulphur according to the SURE double combustion method, wherein the furnace preferably comprises a first and a second combustion region. Alternatively, a second furnace with a second combustion region is preferably connected to a first furnace with a first combustion region. In the first combustion region, preferably less than one third of the hydrogen sulphide is oxidized to sulphur dioxide. In the second combustion region, the molar ratio of hydrogen to sulphur oxide is preferably adjusted by further burning of hydrogen sulphide to sulphur dioxide to bring the molar ratio to 2 mol hydrogen sulphide and 1 mol sulphur oxide or to a ratio approximating thereto.

A catalytic converter in the sense of the invention is a reactor designed to facilitate the reaction of hydrogen sulphide and sulphur oxide to elementary sulphur. The reactor may include a bed containing a catalyst such as aluminum oxide or titanium oxide. One or more additional catalytic converters may be connected to a first catalytic converter. Before entering the catalytic converter the sour gas may be reheated above 200° C. by suitable means for heating such as a heat exchanger, for instance.

As means for extracting elementary sulphur a condenser may be employed. A condenser in the sense of the invention is a reactor that is preferably configured to facilitate the condensing of sulphur vapor to liquid and/or solid sulphur. The sour gas containing sulphur vapor can be additionally cooled in the condenser below 140° C. Additionally, the condenser may be arranged between the furnace and the first catalytic converter.

Likewise, a condenser may be arranged between the first catalytic converter and a second catalytic converter, between the second catalytic converter and a third catalytic converter or between the third catalytic converter and the hydrogenation reactor.

The hydrogenation reactor preferably is a reactor configured to perform the hydrogenation reaction of the sour gas. The reactor may particularly include, without being restricted to, means for heating the sour gas such as a burner before introduction into the reactor, a reaction region, a heat exchanger, in particular a waste heat boiler for generating steam, and/or a catalyst promoted with nickel-chromium or chromium-molybdenum.

As a means for providing hydrogen a supply or a reducing gas generator may be employed.

Further, a water removal unit in the sense of the invention particularly is a device designed for removing formed water from the sour gas. Such a water removal unit may be a column such as a quench column or a stripping column, wherein the sour gas is preferably cooled below the boiling point of water, the water condenses and is removed from the gas phase in the column. A water removal unit may also be a chilling unit or a molecular sieve drier. The removed water may be further treated in a sour water stripper unit.

Furthermore, a compressor stage in the sense of the invention preferably is a device that increases the pressure of the sour gas. The compressor stage is configured to compress residual carbon dioxide to at least 2 bar, preferably to at least 80 bar. Further water condensation is likely upon compression requiring the need for a separator to allow removal of sour water that has condensed. This will likely be required inter-stage of the compressor to ensure optimal performance of the compressor.

Means for injection of carbon dioxide into an oil well may include, without being restricted to, pipes suitable for transportation of compressed gas, pumps and means for flow control such as vents or valves.

According to another embodiment, the means for providing hydrogen comprise a reducing gas generator or a supply of hydrogen from a plant such as a steam methane reformer.

According to yet another embodiment, an air separation unit is preferably connected to the furnace. Such an air separation unit may comprise means for cooling air such as a refrigeration cycle, cold equipment within an insulated enclosure and a distillation column suitable for cryogenic distillation. Optionally, the air separation unit may also include a heat exchanger designed to cool incoming air against product oxygen and nitrogen streams.

According to another embodiment, the compressor stage and/or the air separation unit is driven by water steam generated in the furnace, the hydrogenation reactor or the reducing gas generator. The reaction heat of the oxidation reaction of hydrogen sulphide can be used to generate water steam through a heat exchanger, in particular a waste heat boiler. The waste heat boiler is a closed vessel designed to heat water and generate steam. The waste heat boiler is typically a fire-tube boiler, wherein hot gases from the reaction furnace preferably pass through tubes that are arranged in a vessel filled with boiler feed water.

BRIEF DESCRIPTION OF THE DRAWINGS

Further advantages, features and examples of the present invention shall be described in the following with reference to the FIGURE, wherein FIG. 1 shows a block diagram of a method/plant designed for recovering sulphur from a sour gas containing hydrogen sulphide and carbon dioxide.

Preferably, as shown in FIG. 1, hydrogen sulphide sour gas 1 recovered from natural gas processing is reacted with a high purity oxygen stream 11 of purity preferably higher than 95% vol, but typically higher than 99% vol, by means of a burner 20 (e.g. BOC SURE burner). If the acid gas 1 is of high strength (>60% vol $H_2S$) there may be the need to using a double combustion like the SURE Double Combustion (see above). In this case two reaction furnaces 2 instead of a single reaction furnace 2 are particularly employed as indicated by the dashed lines. Further, sulphur 14 is preferably removed via condensers after the reaction furnace 2 and two (or three) catalytic converters 21. The remaining $SO_2$ and COS is converted to $H_2S$, $H_2O$ and $CO_2$ in a hydrogenation step performed in a hydrogenation reactor 24 following the catalytic converters 21. In order to prevent built-up of nitrogen in the sulphur recovery unit (SRU) 100 an enriched air or oxygen/natural gas mixture is fired in the reducing gas generator 27 or from a steam methane reformer plant to generate the hydrogen 16 necessary for the hydrogenation. Substoichiometric firing conditions prevent high flame temperatures and generate hydrogen or carbon monoxide reducing conditions required for the hydrogenation. This is akin to the conditions found in partial oxidation reactors for the generation of syn-gas. Steam from the waste heat boiler can also be added as a moderator, if necessary.

Alternatively, an indirect natural gas exchanger can be used directly providing a source of hydrogen can be injected upstream of the hydrogenation reactor or sufficient hydrogen is present in the sour gas, which is not uncommon for oxygen fired sulphur plants where significant hydrogen is generated from the thermal decomposition of hydrogen sulphide under the high temperature conditions common with oxygen fired plant. A fast quench waste heat boiler would minimize the reaction of hydrogen and sulphur through the boiler, maintaining higher levels of hydrogen in the sour stream sufficient for hydrogenation requirements in the downstream plant. Downstream of a unit conducting the hydrogenation step 24a first water removal unit 25 for removing the majority of the water 15 produced in the Claus reaction is arranged. The water 15 can be removed by a direct water quench. After water 15 has been removed the remaining stream is typically burnt in an incinerator or $H_2S$ is recovered and recycled in a tail gas clean-up unit (TGCU).

However, because stream 12 from the quench 25 contains primarily $CO_2$ with some residual moisture, $H_2S$, $H_2$, $N_2$, and residual carbon monoxide, stream 12 can be utilized as a by-product from the sulphur recovery unit (SRU) 100. The $CO_2$ content would typically be >95% vol on a dry basis for an oxygen purity of 99.5% vol.

Further, water 15 is removed from the $CO_2$-rich stream 12 in a second water removal 28 unit by condensing water between the compressor stages. The second water removal unit 28 may be a chilling unit (ammonia or the like) or a molecular sieve drier that can be used to remove moisture to those levels necessary for pipeline transportation or re-injection.

Compression of the $CO_2$-rich stream 12 to particularly a minimum of 80 bar in a compressor stage 26 is required for the residual carbon dioxide 12 to become supercritical. This is desirable before it can be injected into the oil well 4 and act as a solvent for the recovery of trapped oil via a technique commonly called "Enhanced Oil Recovery" (EOR). Since the $CO_2$-rich stream 12 has a low $H_2S$ content, it can safely be piped over long distances (unlike high strength acid gas re-injection).

Further, the invention also prevents loss of $CO_2$ to the atmosphere, which may otherwise occur with a typical air based plant, so that the carbon footprint from the process is significantly reduced. In effect, all the $CO_2$ 12 present within the natural gas, i.e., 20 to 80% vol, is recovered and re-injected. Particularly, the $H_2S$ content of the $CO_2$-rich stream 12 is low (<5% vol), particularly <2% vol, and therefore minimizes the possibility of interaction with oil/gas on re-injection. The $H_2S$ content can, if necessary, be reduced by the selective removal (using an amine) in a TGCU. In this instance, the $CO_2$-rich stream 12 from the amine absorber overhead would be the stream that would be dried, compressed and re-injected. The $H_2S$ recovered may be recycled into the furnace 2.

Actually, the process can potentially be applied to most sulphur recovery technologies that use selective oxidation or sub dew point, for example, to increase the sulphur conversion. For grass roots applications, this would not be necessary as the $H_2S$ conversion is in effect 100% (no release of $H_2S$ to the atmosphere) and therefore there is no requirement to improve the conversion, unless a lower concentration of $H_2S$ is required in the $CO_2$ product. Therefore, conversion of existing plants using these technologies to high purity oxygen should be possible.

Further, minimization of the nitrogen present in the $CO_2$ stream 12 is particularly important, which can only be achieved by using high purity oxygen 11 in the SRU, for instance. For high strength acid gas, the use of SURE Double Combustion is particularly important. Additionally, it is particularly recommended that pure hydrogen 16 can be injected upstream of the hydrogenation section 24 in which hydrogen is produced from a reducing gas generator 27 using oxygen and natural gas or from a plant such as a steam methane reformer. Other components in the $CO_2$ product 12 such as $H_2$ and CO are present in low quantities and can be minimized in the design and operation of the plant.

Control of the hydrogen in the SRU 100 is possible by altering the quench rate in a waste heat boiler and the production in the reducing gas generator 27. A waste heat boiler may be a part of the furnace 2. Injection of pure $H_2$ 16 produced from a generator 27 or a steam methane reformer would be optimal; however, natural gas firing in a reducing gas generator 27 with oxygen can be carried out under much more stable and lower stoichiometries. Analysis of $H_2$ 16 downstream of the hydrogenation section (reactor) 24 can control overall $H_2$ and CO levels.

The production of a by-product $CO_2$ stream 12 from a sulphur recovery unit 100 for the purpose of re-injection into a gas 41 or oil field 4 would have the following benefits: reduced $CO_2$ emissions; almost zero emissions of $H_2S$ to the atmosphere; $CO_2$ product 12 from the SRU 100 for the enhanced oil recovery; high purity oxygen minimizing the size and cost of a new plant; higher temperature destruction of BTX than is possible with air therefore minimizing the requirement for natural gas injection into the SRU and minimizing operational problems caused by carbon lay-down in the plant from incomplete BTX destruction.

The use of almost pure oxygen 11 in the SRU 100 minimizes capital costs of the plant 100.

Also of significance is the possible oxygen injection by means of an air separation unit 3 (also called ASU) within the SRU 100. Many regions in the world use the injection of high pressure nitrogen 13 into oil fields 4 or condensate gas fields 41. Waste oxygen 11 can be produced as a by-product in this instance, which can be enriched through suitable plant design to a level suitable for application in an SRU 100 as described above. Steam generated from the SRU 100, in particular from the furnace 2, the hydrogenation reactor 24 and/or the reducing gas generator 27, can be used to drive main and booster air compressors of the air separation unit 3 or the compressor stage 26.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding European patent application No. EP 11007676.7, filed Sep. 21, 2011, are incorporated by reference herein.

| Reference Numerals | |
|---|---|
| 1 | sour gas |
| 11 | (High purity) oxygen |
| 12 | (Supercritical) carbon dioxide |
| 13 | nitrogen |
| 14 | Elemental liquid sulphur |
| 15 | water |
| 16 | reducing gas or hydrogen |
| 2 | (Single reaction) furnace |
| 20 | burner |
| 21 | catalytic converter |
| 24 | hydrogenation reactor |
| 25 | first water removal unit |
| 26 | compressor stage |
| 27 | reducing gas generator (natural gas, air and/or oxygen) or direct $H_2$ injection |
| 28 | second water removal unit |
| 3 | air separation unit |
| 4 | oil field (well) |
| 41 | condensate gas field |
| 100 | Plant (SRU) |

The invention claimed is:

1. A method for recovering sulphur from a sour gas containing hydrogen sulphide and carbon dioxide, comprising:
    subjecting said sour gas to oxidation, wherein a part of the hydrogen sulphide is oxidized to sulphur dioxide and water,
    reacting the resultant sulphur dioxide with residual hydrogen sulphide to produce elementary sulphur,
    removing elementary sulphur to obtain a carbon dioxide stream containing said carbon dioxide and any carbon dioxide generated by said oxidation of said sour gas,
    compressing said carbon dioxide stream, wherein compression is conducted in multiple compressor stages and water is removed from said carbon dioxide stream by condensing water between compressor stages, and
    injecting at least a part of said carbon dioxide and/or said carbon dioxide generated by said oxidation of said sour gas into an oil well.

2. The method according to claim 1, wherein said sour gas is oxidized at a temperature above 1000° C.

3. The method according to claim 1, further comprising removing water from said sour gas prior to said compression.

4. The method according to claim 3, wherein removal of water prior to said compression is performed by a direct water quench.

5. The method according to claim 1, wherein the reacting of the sulphur dioxide with residual hydrogen sulphide to produces a gas containing elementary sulphur in the form of sulphur vapor, and removal of elementary sulphur comprises:
    condensing said sulphur vapor to form liquid and/or solid sulphur, and
    separating said liquid and/or solid sulphur from the gas phase.

6. The method according to claim 1, wherein said sour gas is hydrogenated after the removal of elemental sulphur.

7. The method according to claim 6, wherein hydrogenation of said sour gas converts $SO_2$, COS and $CS_2$ to sulphur and water vapor.

8. The method according to claim 6, wherein hydrogen used for said hydrogenation is provided by a steam methane reformer.

9. The method according to claim 6, wherein hydrogen used for said hydrogenation is provided by a reducing gas generator, wherein said reducing gas generator is fired by natural gas and air and/or oxygen, and wherein steam is optionally added as a temperature moderator.

10. The method according to claim 1, wherein said carbon dioxide stream is compressed to at least 2 bar.

11. The method according to claim 10, wherein said carbon dioxide stream is compressed to at least 80 bar.

12. The method according to claim 1, wherein said oxidation of said sour gas is performed in the presence of high purity oxygen.

13. The method according to claim 12, wherein the high purity oxygen is provided by an air separation process.

14. The method according to claim 13, wherein nitrogen formed in said air separation process is injected into an oil well and/or into a condensate gas field.

15. The method according to claim 1, wherein the concentration of $H_2S$ in said sour gas is larger than 60% vol, and said oxidation of sour gas is performed in two reaction furnaces.

16. The method according to claim 1, wherein the concentration of $H_2S$ in said sour gas is smaller than 60% vol, and said oxidation of sour gas is performed in a single reaction furnace.

17. A plant for recovering sulphur from a sour gas containing hydrogen sulphide and carbon dioxide, comprising:
- at least one furnace (2) for oxidation of hydrogen sulphide to sulphur dioxide and water,
- a catalytic converter (21) connected to said at least one furnace (2) for formation of elementary sulphur from sulphur dioxide and hydrogen sulphide,
- means for extracting said elementary sulphur,
- a hydrogenation reactor (24) connected to said catalytic converter (21) for hydrogenation of sour gas,
- means for providing hydrogen for use in hydrogenation connected to said hydrogenation reactor,
- a first water removal unit (25) connected to the hydrogenation reactor (24) for removing of water,
- a compressor unit (26) connected to said first water removal unit (25) for compressing the resultant carbon dioxide stream, wherein said compressor unit comprises multiple compressor stages,
- a second water removal unit (28) for removing water from the carbon dioxide stream by condensing water between compressor stages, and
- means for injecting the carbon dioxide stream from said second water removal unit (28) into an oil well, wherein said means for injecting is connected to said compressor unit (26).

18. A plant according to claim 17, wherein said means for providing hydrogen comprises a reducing gas generator (27).

19. A plant according to claim 17, wherein an air separation unit (3) is connected to the at least one furnace (2).

20. A plant according to claim 17, wherein said compressor unit (26) and/or said air separation unit (3) are designed to be driven by steam generated in said at least one furnace (2), said hydrogenation reactor (24) and/or said reducing gas generator (27).

* * * * *